(12) United States Patent
Kay

(10) Patent No.: US 10,803,768 B2
(45) Date of Patent: Oct. 13, 2020

(54) ILLUMINATION AND HYGIENE ASSISTANCE APPARATUS

(71) Applicant: Karen Rubin Kay, New York, NY (US)

(72) Inventor: Karen Rubin Kay, New York, NY (US)

( * ) Notice: Subject to any disclaimer, the term of this patent is extended or adjusted under 35 U.S.C. 154(b) by 192 days.

(21) Appl. No.: 15/961,126

(22) Filed: Apr. 24, 2018

(65) Prior Publication Data
US 2018/0308388 A1    Oct. 25, 2018

Related U.S. Application Data

(60) Provisional application No. 62/489,253, filed on Apr. 24, 2017.

(51) Int. Cl.
| G04F 1/00 | (2006.01) |
| G09B 19/00 | (2006.01) |
| G08B 21/24 | (2006.01) |
| F21V 33/00 | (2006.01) |
| G08B 5/36 | (2006.01) |
| G09B 23/28 | (2006.01) |
| F21Y 115/10 | (2016.01) |

(52) U.S. Cl.
CPC ...... *G09B 19/0084* (2013.01); *F21V 33/0064* (2013.01); *G04F 1/005* (2013.01); *G08B 5/36* (2013.01); *G08B 21/245* (2013.01); *G09B 23/283* (2013.01); *F21Y 2115/10* (2016.08)

(58) Field of Classification Search
CPC ........ G04F 1/005; G04F 1/00; F21V 33/0064; G08B 5/36; G08B 21/245; G09B 23/283; G09B 19/0084
See application file for complete search history.

(56) References Cited

U.S. PATENT DOCUMENTS

| 7,663,977 | B1* | 2/2010 | Hartelius | G04F 1/005 221/24 |
| 7,782,214 | B1* | 8/2010 | Lynn | G09B 19/0076 340/573.1 |
| 2006/0133215 | A1* | 6/2006 | Gordon | G04G 11/00 368/79 |
| 2012/0147712 | A1* | 6/2012 | Lynn | G04F 1/00 368/89 |
| 2012/0287761 | A1* | 11/2012 | Higgins | G04G 11/00 368/109 |
| 2014/0242562 | A1* | 8/2014 | McSterling | G08B 21/245 434/257 |
| 2015/0098913 | A1* | 4/2015 | Downey | A45D 40/00 424/59 |
| 2017/0270774 | A1* | 9/2017 | Fateh | B65D 51/245 |
| 2018/0218636 | A1* | 8/2018 | Alaouf | G04G 11/00 |

* cited by examiner

*Primary Examiner* — Sean Kayes
(74) *Attorney, Agent, or Firm* — Pryor Cashman LLP

(57) ABSTRACT

An illumination and hygiene assistance apparatus includes a housing, a power supply, a light disposed on the housing, the light configured to be operable when power is supplied to the apparatus by the power supply, a first actuatable button disposed on the housing, a second actuatable button disposed on the housing, and a timer disposed within the housing, the timer having a display visible to a user, where the display of the timer is configured to notify the user after a first time period has passed from when the user has actuated the first button, and to notify the user after a second time period has passed from when the user has actuated the second button, the first and second time periods being of different duration.

10 Claims, 3 Drawing Sheets

ILLUMINATION AND HYGIENE ASSISTANCE APPARATUS

CROSS-REFERENCE TO RELATED APPLICATIONS

The present application claims priority to U.S. provisional application Ser. No. 62/489,253, filed Apr. 24, 2017, the disclosure of which is incorporated herein by reference in its entirety.

TECHNICAL FIELD

The invention generally relates to an illumination and hygiene assistance apparatus. More specifically, the invention relates to an illumination and hygiene assistance apparatus for assisting a user with timing of washing his or her hands or brushing his or her teeth.

BACKGROUND OF THE INVENTION

There are recommended durations for washing one's hands and brushing one's teeth. In particular, the correct amount of time to wash one's hands is twenty seconds, according to the Center for Disease Control. Additionally, the correct amount of time to brush one's teeth is two minutes, as established by the American Dental Association. Often, people wash their hands or brush their teeth for a duration less than the recommended amount of time. There is a need for an apparatus that efficiently addresses and remedies this deficiency.

SUMMARY OF THE INVENTION

In general, in one aspect, the invention features an illumination and hygiene assistance apparatus including a housing, a power supply, a light disposed on the housing, the light configured to be operable when power is supplied to the apparatus by the power supply, a first actuatable button disposed on the housing, a second actuatable button disposed on the housing, and a timer disposed within the housing, the timer having a display visible to a user, where the display of the timer is configured to notify the user after a first time period has passed from when the user has actuated the first button, and to notify the user after a second time period has passed from when the user has actuated the second button, the first and second time periods being of different duration.

Implementations of the invention may include one or more of the following features. The housing may include plastic. The housing may include a glass side casing. The power supply may include a two or three prong electrical plug. The plug may be disposed on a standoff portion disposed on or within the housing, or at an end of an electrical wire connected to the apparatus. The light may include a light emitting diode (LED). The first button and the second button may extend outward from a surface of the housing and be configured to move inward when actuated by the user. The first button and the second button may be flush with a surface of the housing. The first button may include an image of a hand. The second button may include an image of a toothbrush. The first time period may be twenty seconds. The second time period may be two minutes. The apparatus may further include speakers disposed within the housing, the speakers configured to deliver an audio cue during either or both of the first and second time periods. The audio cue may be a musical composition. The display of the timer may be configured to notify the user by a visual cue. The visual cue may be a countdown. The first button and the second button may be illuminated when power is supplied to the apparatus by the power supply.

DETAILED DESCRIPTION OF THE INVENTION

The invention relates to a small electrical apparatus including a light fixture or illumination device that may be placed in a dark space, such as a bathroom at night. The apparatus may include three distinct features. The apparatus may include lights such as light emitting diode (LED) lights to illuminate and to provide comfort and convenience in the dark space.

The invention may include two buttons, tabs, or switches that, when pressed, activate timers with different countdowns. The timers may be activated by depressable or actuatable buttons, tabs, or switches. These timers may each prompt an audio or visual cue lasting a predetermined period of time. For example, pressing a hand-washing button may produce an audio or visual cue lasting twenty seconds, which is the correct amount of time to wash one's hands, according to the Center for Disease Control. Pressing a teeth-brushing button may produce an audio or visual cue lasting two minutes, which is the correct amount of time to brush one's teeth, as established by the American Dental Association. Once a button is actuated, a display of the timer may display a countdown of a predetermined period of time. At the end of the countdown, the display may turn off or become blank, and the apparatus may produce an alarm or beeping sound. The buttons of the present invention may be illuminated when plugged in or otherwise in operation.

This apparatus has the advantages of giving the user peace of mind or a sense of security in the dark space, and aiding individuals in properly washing their hands and brushing their teeth to their health benefit. The apparatus may prove to be particularly useful to children.

This apparatus may include a plastic housing and/or a glass casing, LED lights, circuitry, separate audio or visual mechanisms activated by separate buttons, and speakers. The apparatus may include a two or three prong electrical plug for connection to a standard, unlimited power source. The plug may be attached to a standoff portion on the housing or may be attached to the end of an electrical wire connected to the circuitry. The apparatus may be used in connection with an electrical outlet near a bathroom sink.

Figure 1:
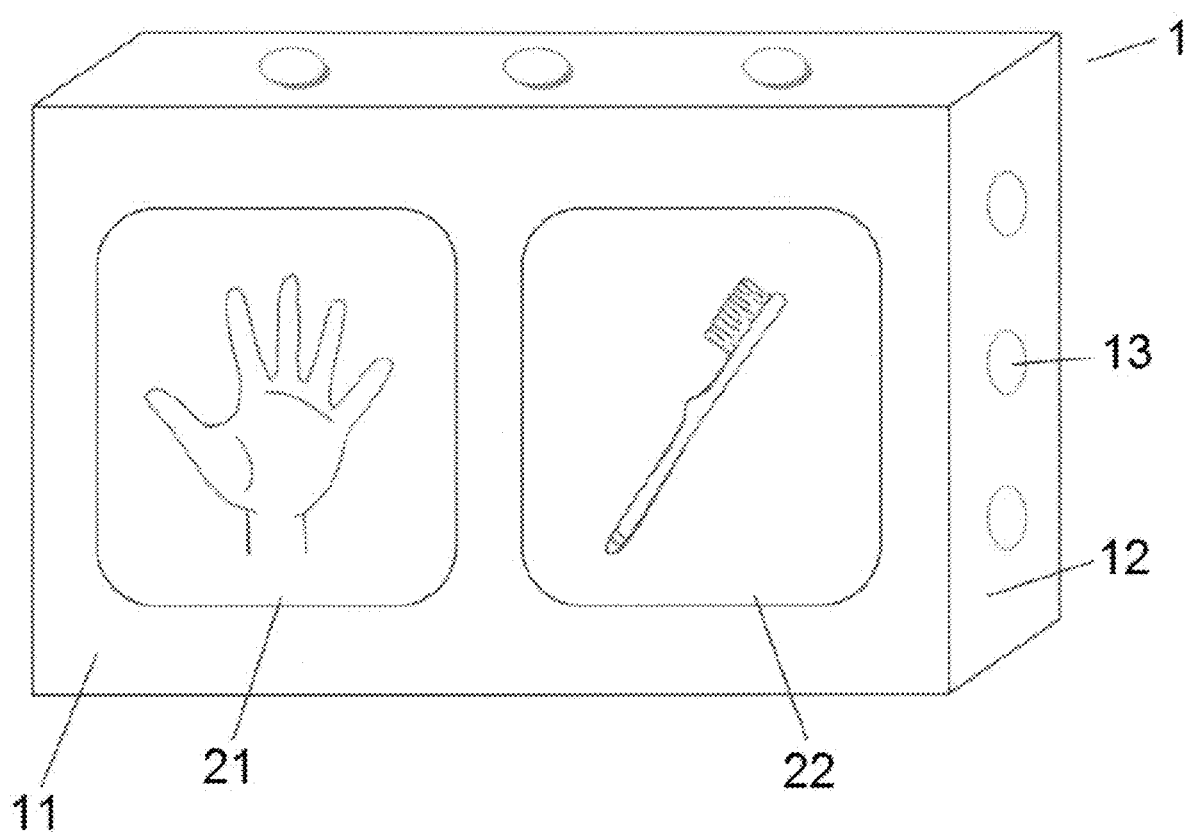
FIG. 1 is a front perspective view of an illumination and hygiene assistance apparatus according to a first embodiment of the present invention.
Figure 2:
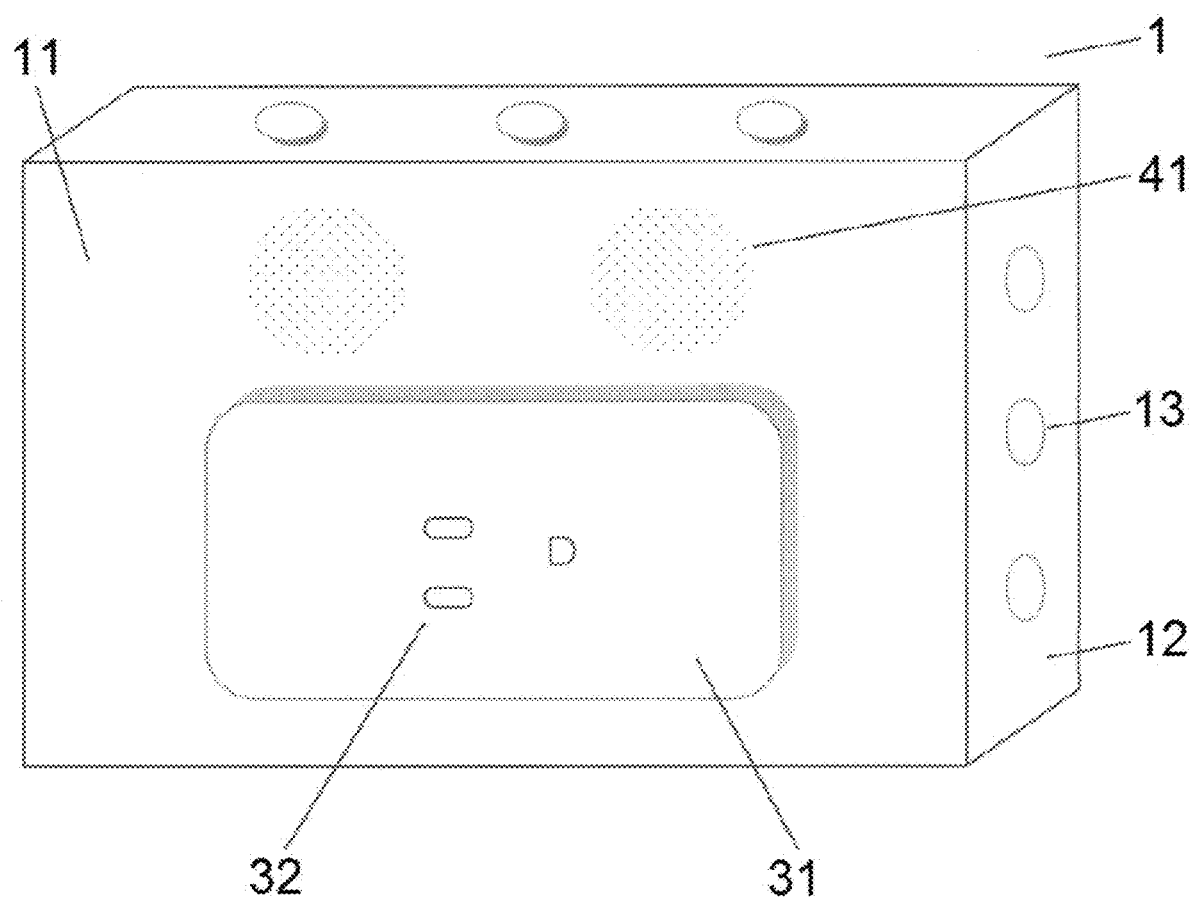
FIG. 2 is a back perspective view of the illumination and hygiene assistance apparatus of FIG. 1.

In the embodiment of FIGS. 1-2, an illumination and hygiene assistance apparatus 1 is illustrated as including a plastic housing 11, a glass casing 12, and lights 13. Additionally, apparatus 1 includes two buttons, a hand-washing button 21 and a teeth-brushing button 22. On a back side of apparatus 11, there is a standoff 31 having an electrical plug 32 for electrical power connectivity. Apparatus 11 also includes speakers 41 that may deliver a musical composition or other audio cue.

Figure 3:
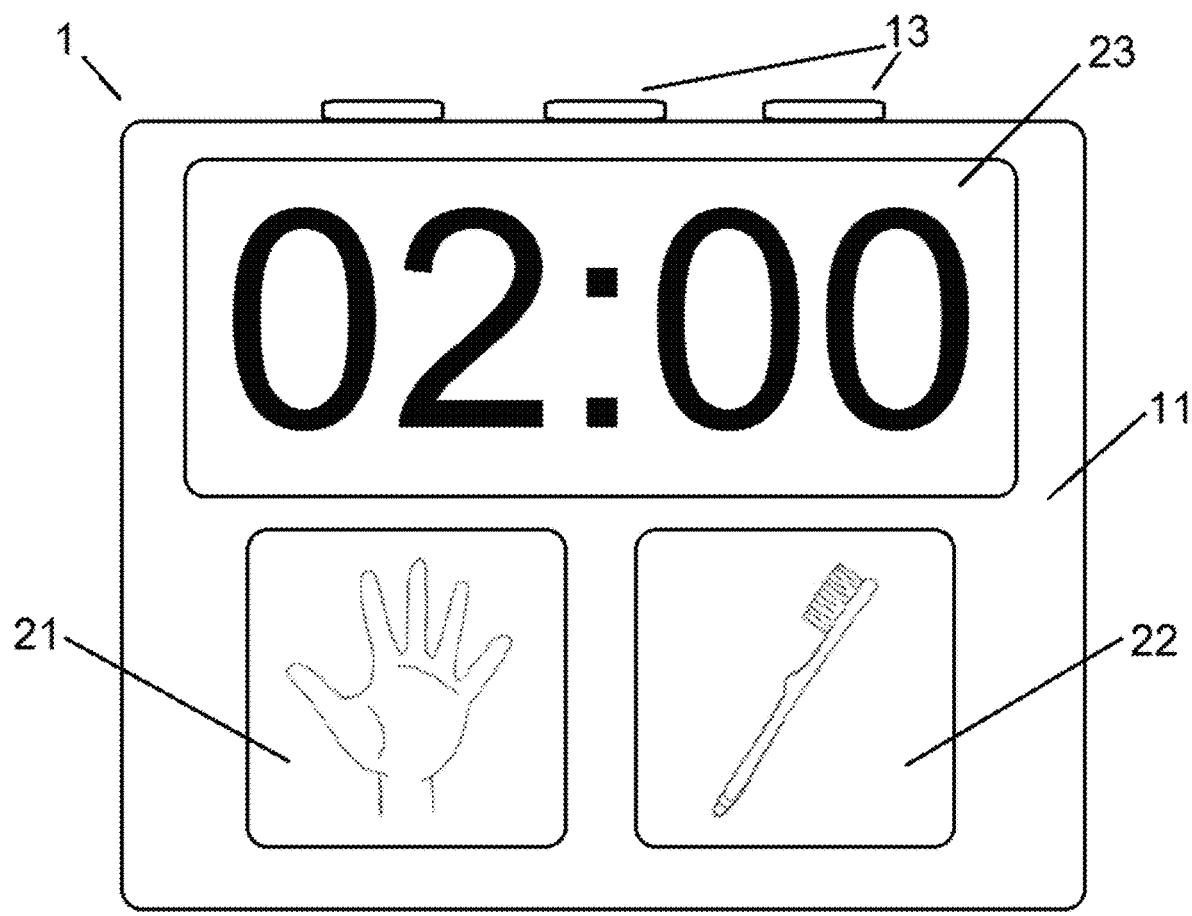
FIG. 3 is a front view of an illumination and hygiene assistance apparatus according to a second embodiment of the present invention.

In the embodiment of FIG. 3, an illumination and hygiene assistance apparatus 1 is illustrated as including a plastic housing 11, lights 13, a hand-washing button 21, and a teeth-brushing button 22. Additionally, apparatus 1 includes a display screen 23 that may display a countdown timer or other visual cue.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. An illumination and hygiene assistance apparatus, comprising:
    a housing;
    a power supply;
    a light disposed on the housing, the light configured to be operable when power is supplied to the apparatus by the power supply;
    a timer disposed in the housing, the timer including a display configured to show a visual cue including a first countdown of about twenty seconds and a second countdown of about two minutes;
    one or more speakers disposed in the housing, the one or more speakers configured to deliver an audio cue including a music composition or an alarm based on the first countdown or the second countdown;
    a first actuatable button disposed on the housing and having a first graphical image of a hand, such that when the first actuatable button is actuated the display shows the first countdown and the one or more speakers deliver a music composition audio cue, and when the first countdown is finished the display becomes blank and the one or more speakers deliver an alarm audio cue; and
    a second actuatable button disposed on the housing and having a second graphical image of a toothbrush, such that when the second actuatable button is actuated the display shows the second countdown and the one or more speakers deliver a music composition audio cue, and when the second countdown is finished the display becomes blank and the one or more speakers deliver an alarm audio cue.

2. The illumination and hygiene assistance apparatus of claim 1, wherein the housing comprises plastic.

3. The illumination and hygiene assistance apparatus of claim 1, wherein the housing includes a glass side casing.

4. The illumination and hygiene assistance apparatus of claim 1, wherein the power supply comprises a two or three prong electrical plug.

5. The illumination and hygiene assistance apparatus of claim 4, wherein the plug is disposed on a standoff portion disposed on or within the housing.

6. The illumination and hygiene assistance apparatus of claim 4, wherein the plug is disposed at an end of an electrical wire connected to the apparatus.

7. The illumination and hygiene assistance apparatus of claim 1, wherein the light comprises a light emitting diode (LED).

8. The illumination and hygiene assistance apparatus of claim 1, wherein the first button and the second button extend outward from a surface of the housing and are configured to move inward when actuated by the user.

9. The illumination and hygiene assistance apparatus of claim 1, wherein the first button and the second button are flush with a surface of the housing.

10. The illumination and hygiene assistance apparatus of claim 1, wherein the first button and the second button are illuminated when power is supplied to the apparatus by the power supply.

* * * * *